A. C. MICHAEL.
WATERING TROUGH.
APPLICATION FILED JUNE 13, 1910.

970,079.

Patented Sept. 13, 1910.
2 SHEETS—SHEET 1.

WITNESSES:
Wᵐ L. Bushong.
L. B. Hodrick.

INVENTOR
Auceal C. Michael
By Minturn & Kremer
ATT'YS.

A. C. MICHAEL.
WATERING TROUGH.
APPLICATION FILED JUNE 13, 1910.

970,079.

Patented Sept. 13, 1910.
2 SHEETS—SHEET 2.

WITNESSES:
Wm. L. Bushong.
L. B. Koerner.

INVENTOR
Auceal C. Michael,
By Minturn & Koerner
ATT'YS.

UNITED STATES PATENT OFFICE.

ANCEAL C. MICHAEL, OF GOSHEN, INDIANA, ASSIGNOR TO SANFORD D. HELM, WILLIAM Q. O'NEALL, AND CHARLES E. LACY, OF CRAWFORDSVILLE, INDIANA.

WATERING-TROUGH.

970,079.    Specification of Letters Patent.    Patented Sept. 13, 1910.

Application filed June 13, 1910. Serial No. 566,563.

*To all whom it may concern:*

Be it known that I, ANCEAL C. MICHAEL, a citizen of the United States, residing at Goshen, in the county of Elkhart and State of Indiana, have invented certain new and useful Improvements in Watering-Troughs, of which the following is a specification.

This invention relates to improvements in troughs for supplying water to live stock and poultry.

One of the principal objects of the invention is to provide automatic means for discharging water from a storage tank into the trough to replenish the latter as fast as its water is consumed and to provide means for replacing the water fed from the tank by air to support the flow.

Another object is to provide means for conveniently refilling the tank and to provide a portable device with means for conveniently refilling the storage tank.

Another object is to provide a drinking fountain of the character referred to which would be simple and effective in its operation, durable, and inexpensive to construct.

I accomplish the objects of the invention by the mechanism illustrated in the accompanying drawing, in which—

Figure 1:
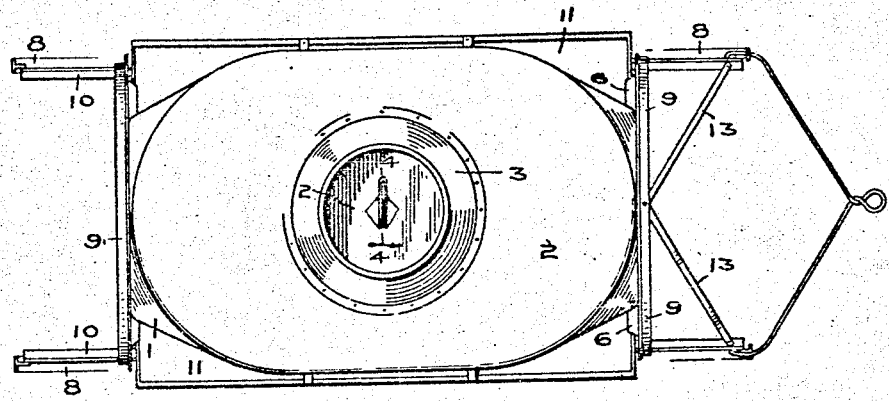
Figure 2:
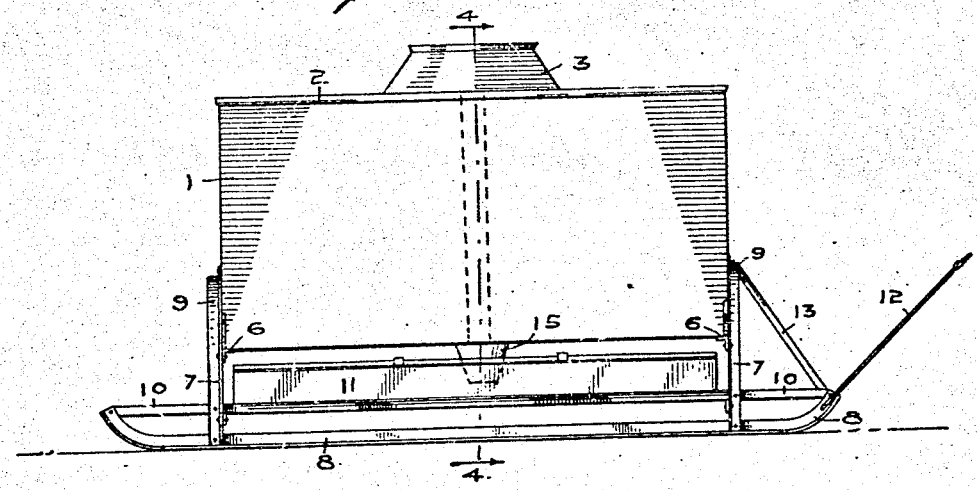

Figure 1 is a top plan view of a watering fountain made in accordance with my invention. Fig. 2 is a side elevation of same. Fig. 3 is a front elevation of the watering fountain. Fig. 4 is a detail in vertical section on the line 4—4 of Figs. 1 and 2, the middle portion being broken away and removed to shorten the view. Fig. 5 is a detail in vertical section of the lower ends of the air supply and water filling tubes on the dotted line 5—5 of Fig. 4. Fig. 6 is an under side view and partial section on the line 6—6 of Fig. 4.

Like characters of reference indicate like parts throughout the several views.

1 is the water storage tank; the top 2, of which has the housing 3 with a central opening 4. The bottom of the tank rests upon angle bar brackets 6 which are secured to vertical parts 7. The parts 7 are rigidly secured to and are supported by said runners 8. The upper ends of the parts are preferably extended in arches 9 which bear against the ends of the tank 1 and assist in retaining the tank in place on the sled. The parts 7 are additionally braced by the horizontal bars 10 and these bars 10 serve also as supports for a removable drinking trough 11.

The front ends of the runners 8 are provided with the draft rods 12 to which power for drawing the device from place to place is applied. This is important as it enables the location of the drinking fountain to be changed with sufficient frequency to prevent the formation of mud holes alongside the fence and even to prevent the wearing away of the grass. Diagonal brace bars 13 extend from the runners to the top of the arch 9.

The bottom 5 has a large central opening from which depends a cup 15 with downwardly tapering sides and open bottom. The top 2 has an opening directly above the cup. 17 is a tube the lower end of which is connected with an air and water tight fit to the lower walls of the cup 15, and its upper end surrounds the opening in top 2 and is fastened to said top. The wall of the tube 17 has the air holes 18 a short distance below the top 2, and it is provided with the diametrically opposite openings 19 near its lower end.

Mounted within the tube 17 is an inner tube 20 of the same length which is fastened at its upper end to the under side of the top 2 and extends to the lower end of cup 15. The walls of the tube 20 have incisions from their lower ends opposite the opening 19 and the material of the walls is bent outwardly as shown at 22 (see Fig. 6) into contact with tube 17 thereby forming two oppositely located air passages 23, and the ends of the wall thus shortened are bent outwardly into contact with the tube 17 forming the closures 24 at the upper edge of openings 19, and of the joints thus formed between the tubes 17 and 20, are made air tight by soldering or otherwise.

25 is an upwardly tapering shell which is inserted within the lower ends of the tubes 17 and 20 so as to leave a free passage from the interior of tube 20 into cup 15 through the openings 19. The interior of the shell 25 forms a seat for a valve 27, here shown as a spherical stopper which is mounted on the lower end of a rod 28. The rod 28 extends upwardly through tube 20 and is attached to an eccentric operating lever 29 fulcrumed on a bar 30 crossing the top opening into tube 20. The valve 27 will be opened or closed by lowering or raising the lever 29.

The operation of my invention is as follows: When it is desired to fill the tank 1 the valve 27 is drawn up by lever 29 closing the entrance to shell 25. Water introduced into tube 20 will pass down and out through opening 19 into cup 15 and thence to the interior of tank 1 filling the latter to the preferred height, the air in the tank being simultaneously forced out through holes 18 into the space between tubes 17 and 20 and thence out at the bottom through the passages 23. When the valve 27 is lowered the water will return through holes 19 and discharge through its shell 25 into the trough 11. When the water in the trough 11 rises to a point above the passages 23 air to support the flow of water will be shut off and therefore the water in trough 11 will only reach a level just above the lower ends of said passages 23. As the water is used from the trough 11 air will enter through passages 23 and pass to the top of tank 1 which will again permit the water to flow through opening 19 and shell 25 into the trough.

Having thus fully described my said invention what I desire to secure by Letters Patent, is—

1. A drinking fountain, comprising sled-runners, posts supported by said runners the tops of said posts being connected in pairs by arches, brackets on said posts, and a water storage tank held between said arches and supported by said brackets.

2. A drinking fountain, comprising sled-runners, upwardly extended in curves at each of their ends, horizontal bars supported by said curved extensions, posts supported by said runners, the tops of said posts being connected in pairs by arches, brackets on said posts, a water storage tank held between said arches and supported by said brackets, and a trough below the tank supported upon said horizontal bars of the sled runners.

3. A drinking fountain, comprising sled-runners, upwardly extended in curves at each of their ends, longitudinal bars supported by said curved extensions, posts supported by sled-runners the tops of said posts being connected in pairs by arches, a water storage tank between said arches supported by the posts, a tube extending down from the inside top of the tank and terminating below the tank, a valve seat within the tube near its lower end, a valve in said seat, an air-tube taking air from the inside of the tank above the water level and discharging below the tank, and a trough below the tank supported upon said horizontal bars of the sled-runners.

4. A drinking fountain, comprising a water storage tank, a cup secured to the bottom of the tank, a tube within the tank extending down from the top of the tank and terminating at the bottom of the cup, said tube having holes through its walls near its upper end and openings through its walls near its lower end, a second tube within the first tube starting from the top of the tank and having openings through its wall discharging through the openings near the bottom of the first tube, said tubes having an air space between them which only discharges through the bottom of the cup, a valve in said cup to prevent the escape of water from the tank when the valve is closed, and a trough below the tank into which the cup projects.

5. A drinking fountain, comprising a water storage tank, a tube within the tank extending down from the top of the tank and terminating below the bottom of the tank, said tube having holes through its walls near its upper end and openings through its walls above and near the bottom of the tank, a second tube within the first tube starting from the top of the tank and having openings through its walls which discharge through the openings near the bottom of the first tube, said two tubes having an air space between them which only discharges at the bottom of both tubes, a valve at or near the bottom of both tubes to prevent the escape of water from the tank when the valve is closed, and a trough below the tank into which the lower ends of the two tubes project.

6. A drinking fountain, comprising a water storage tank, a tube within the tank extending down from the top of the tank and terminating below the bottom of the tank, said tube having air holes through its walls near the top of the tank and wall openings near the lower end of the tube, a second tube having portions of its wall bent out into contact with the first tube to form a plurality of air passage extensions and also to form openings which register with the lower wall openings of the outer tube, the air space between the two tubes being closed off in an air tight manner from said lower wall-openings, a valve at the bottom of said tubes to prevent the escape of water from the tank when the valve is closed, and the trough below the tank into which the lower ends of the said pipes project.

In witness whereof, I, have hereunto set my hand and seal at Indianapolis, Indiana, this, 11th day of April, A. D. one thousand nine hundred and ten.

ANCEAL C. MICHAEL [L. S.].

Witnesses:
ANTHONY DEAHL,
F. W. WOERNER.